United States Patent [19]

Eng et al.

[11] Patent Number: 5,455,701
[45] Date of Patent: Oct. 3, 1995

[54] PACKET SWITCHING APPARATUS USING PIPELINE CONTROLLER

[75] Inventors: Kai Y. Eng, Eatontown; Mark J. Karol, Fair Haven, both of N.J.

[73] Assignee: AT&T Corp., Murray Hill, N.J.

[21] Appl. No.: 218,995

[22] Filed: Mar. 28, 1994

Related U.S. Application Data

[63] Continuation of Ser. No. 760,652, Sep. 16, 1991, abandoned.
[51] Int. Cl.⁶ ..................................................... H04J 14/08
[52] U.S. Cl. ......................... 359/135; 359/139; 359/121; 359/165
[58] Field of Search ........................................ 359/117, 123, 359/125, 127, 133, 128, 139, 120, 121, 135, 165; 370/60, 60.1, 94.1, 94.3, 54, 56

[56] References Cited

U.S. PATENT DOCUMENTS

| | | | |
|---|---|---|---|
| 3,428,946 | 2/1969 | Batcher et al. | 340/146.2 |
| 4,630,254 | 12/1986 | Tseng | 359/120 |
| 4,710,914 | 12/1987 | Robieux | 370/3 |
| 4,726,644 | 2/1988 | Mathis | 350/96.16 |
| 4,731,878 | 3/1988 | Vaidya | 359/165 |
| 4,748,617 | 5/1988 | Drenlo | 359/158 |
| 4,755,986 | 7/1988 | Hirata | 370/94.1 |
| 4,797,879 | 1/1989 | Habbab et al. | 370/3 |
| 4,873,681 | 10/1989 | Arthurs et al. | 370/3 |
| 4,899,333 | 2/1990 | Roediger | 370/94.1 |
| 4,955,016 | 9/1990 | Eng et al. | 370/60 |
| 4,955,017 | 9/1990 | Eng et al. | 370/60 |
| 5,005,167 | 4/1991 | Arthurs | 359/135 |
| 5,093,743 | 3/1992 | Eng | 359/117 |

FOREIGN PATENT DOCUMENTS 0334054 2/1989 European Pat. Off. .

OTHER PUBLICATIONS

K. Y. Eng., "A Photonic Knockout Switch for High–Speed Packet Networks," IEEE Journal of Selected Areas in Communications vol. 6, No. 7, Aug. 1988, pp. 1107–1116.
K. Y Eng, "A Photonic Knockout Switch for High–Speed Packet Networks," IEEE Globecom 87, vol. 3, Nov. 1987, pp. 1861–1865.
K. Y. Eng and M. J. Karol "The Growable Switch Architecture: A Self-Routing Implementation for Large ATM (List continued on next page.)

Primary Examiner—Leslie Pascal
Attorney, Agent, or Firm—Eugene S. Indyk

[57] ABSTRACT

A high-speed, high-capacity, asynchronous transfer mode packet switching system comprises electronic and optical components. The switching system may be a high-capacity multiple-gigabit-per-second optical system controlled by a relatively low-speed electronic controller operating at one hundred megabit-per-second rates. The switching system comprises a plurality of N input lines. Each of the N lines carries a succession of data packets or cells to the switching system. Each of the cells is input to the switch in time slots or cell periods of predetermined duration. A laser transmitter producing a separate and distinct carrier frequency identifying its associated input is responsive to each of the N input lines. The laser transmitters are connected to the input of an optical star coupler which is connected to a series of tunable receivers. There is one tunable receiver for each output of the switching system. Groups of tunable receivers are connected to the inputs of a series of relatively small packet switching modules. The receivers are tuned by a relatively low-speed electronic controller. The controller is responsive to header information in the incoming cells and produces a series of control packets having, for example, activity, priority, and source information. The control packets are pipelined through the controller and sent to the appropriate tunable receivers where they indicate which frequency coming out of the star coupler they should be tuned, thereby causing each receiver to be receptive to the output of an appropriate one of the laser transmitters.

8 Claims, 6 Drawing Sheets

OTHER PUBLICATIONS

Applications", IEEE Int. Conf. on Communications ICC91, vol. 2, Jun. 1991, pp. 1014–1020.

I. Leslie and S. McAuley, "Fairisle: An ATM Network for the Local Area" Computer Communications Review vol. 21, No. 4, Sep. 3, 1991, pp. 327–336.

Midwinter et al., "Frequency–Division–Multiplex Coherent Optical Switch . . . ", Proc. of the OSA Topical Meeting on Photonic Switching, Mar. 1–3, 1989, Salt Lake City, Utah, pp. 260–262.

E. Arthurs e tal., "HYPASS: An Optoelectronic Hybrid Packet Switching System", IEEE Jour. of Selected Areas In Comm., vol. 6, No. 9, Dec. 1988, pp. 1500–1510.

T. T. Lee, et al., "A Broadband Optical Multicast Switch," International Switching Symposium, May 27–Jun. 1, 1990, vol. III, pp. 9–13.

PACKET SWITCHING APPARATUS USING PIPELINE CONTROLLER

This application is a continuation of application Ser. No. 07/760,652, filed on Sep. 16, 1991, now abandoned.

FIELD OF THE INVENTION

This invention relates to packet switching systems. More particularly, this invention relates to optoelectronic packet switching systems having a reduced electronic controller speed for a given data rate and switch capacity.

BACKGROUND OF THE INVENTION

Packet switching techniques are useful in designing high-speed, high-capacity switching systems. Specifically, there has been a great deal of interest in using asynchronous transfer mode (ATM) packet switches for broadband integrated services digital network (B-ISDN) applications. Worldwide efforts, therefore, have been underway to implement such packet switches at relatively low bit rates, such as 155 Mbits/sec. There also has been considerable interest in the area of gigabit-per-second packet switches. There are notable challenges to be met, however, in developing high-capacity switches at these speeds.

For example, high-speed optical techniques have become attractive in implementing high-speed packet switches. However, not all the required functionality may be implemented optically. For example, logic and memory functions are now best implemented electronically. In order to take full advantage of the increasing speed and capacity offered by optical switching, the associated electronics must operate at faster and faster speeds, which adds considerable expense to a switching system as speed and capacity increase.

One example of a packet switching system using optical and electronic components is described in U.S. Pat. No. 4,873,681 which characterizes such a switching system as a hybrid optical and electronic packet switch. The patent states that processing in the electronic domain can be done at speeds that are slower than the optical bit rates. However, this reduction in speed cannot be such that the electronic processing cycle is longer than the cell transmission duration. Therefore, there is a size and bit rate restriction on the switch for a given electronic processing speed. Increasing the electronic processing speed to accommodate an increase in the speed or capacity of the switching system greatly increases the cost of the switching system, especially in high-capacity gigabit-per-second optical switching systems. Therefore, it would be advantageous if such increased speed of electronic processing could be avoided.

There thus is a need for an economical packet switching system having higher capacity and higher switching speeds, without requiring a corresponding increase in electronic controller speed at a prohibitive cost. It is an object of this invention to meet such a need by providing an opto-electronic packet switching system having a relatively low electronic controller speed.

SUMMARY OF THE INVENTION

In accordance with the object of the invention noted above, the relatively low electronic controller speed is achieved by an electronic controller which accomplishes at least some of its functions by performing a pipelining operation. A specific example of a packet switching apparatus in accordance with this invention comprises a plurality of inputs, each for receiving a succession of data packets or cells in predetermined time slots or cell periods of predetermined time duration. The packet switching apparatus also comprises an optical cell distribution network for distributing the data packets to selected ones of a plurality of desired groups of outputs. A pipeline electronic controller has an input responsive to destination-identifying header information in the data packets for producing an output which directs the cell distribution network to distribute the data packets to the desired output groups in accordance with the header information.

DETAILED DESCRIPTION OF THE INVENTION

Figure 1:
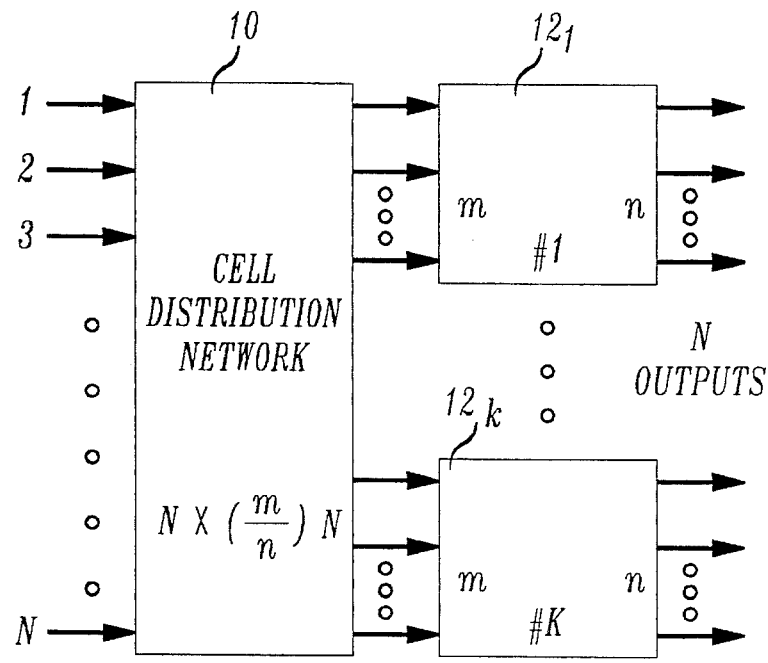
FIG. 1 shows a high level schematic diagram of an example of an ATM packet switch architecture useful for the invention of this application.

FIG. 1 shows a high-level schematic diagram of an example of a switch architecture for the invention of this application. The architecture includes a memoryless cell distribution network 10 which receives a succession of data packets or cells on each of N asynchronous transfer mode (ATM) cell inputs 1, 2, 3 . . . N shown in FIG. 1. Each of the N transmission lines delivers to its respective input of the cell distribution network 10 a sequence of data packets or cells. Each of the data packets appears at the inputs of the cell distribution network 10 in a succession of time slots or cell periods, each of predetermined time duration. Each of the data packets or cells comprises header information, identifying the desired destination address of the data packet. Each cell also comprises priority information and a predetermined number of data bits. The priority information is used to resolve conflicts associated with a possible occurrence of attempting to send more than one packet to the same output during the same time slot.

The cell distribution network 10 causes cells appearing on each of the inputs 1, 2, 3, . . . N to be arranged in a plurality of groups of cells. Each group of cells comprises up to m cells in the example of the invention shown in FIG. 1. Specifically, the cell distribution network 10 arranges the cells into k=N/n groups according to their destination addresses. Each group of up to m cells is directed in each time slot to m inputs of a respective one of a plurality of output packet switch modules $12_1$ . . . $12_k$, which then switches each of the cells at the m inputs to a desired one of n outputs. The total number of outputs from the switching system of FIG. 1 thus is N.

Figure 2:
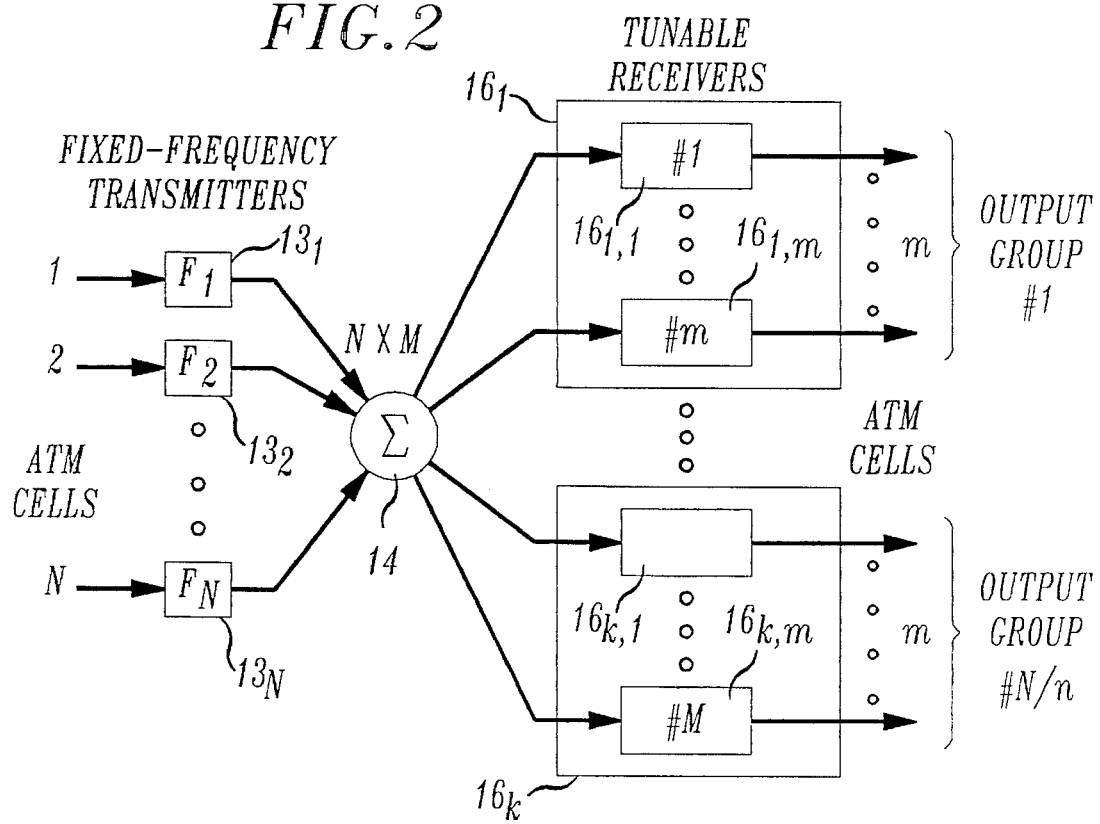
FIG. 2 is a more detailed schematic diagram of the cell distribution network shown in FIG. 1 embodying an N×M optical star coupler connecting N inputs with M= m N/n tunable receivers.

FIG. 2 shows a detailed schematic diagram of an N×M optical star coupler based cell distribution network useful as the cell distribution network 10 shown generally in FIG. 1. Each of the data packets arrives at the cell distribution network 10 on a plurality of asynchronous transfer mode (ATM) cell inputs 1, 2, . . . N. Each of the packets arriving during a given time slot modulate a respective fixed-frequency laser transmitter $13_1$ to $13_N$ operating on carrier frequencies $F_1, F_2 \ldots F_N$. There is one fixed-frequency transmitter per input 1, 2, . . . N and each of those transmitters operates at a carrier frequency separate and distinct from the carrier frequencies of the other transmitters. The outputs of the fixed-frequency transmitters $13_1$ to $13_N$ are directed to the input waveguides of an N×M optical star coupler 14, which sums the modulated outputs of the fixed-frequency transmitters. The output waveguides of the star coupler 14 evenly distribute the summed outputs of the fixed-frequency transmitters to the inputs of a series of tunable receivers. The frequency to which each of the receivers is tuned is determined by the content of control packets produced in response to header information in the data packets received at the inputs of the cell distribution network 10. In effect, each of the tunable receivers listens to one of the fixed-frequency transmitters so that data packets appearing on each of the ATM cell inputs is directed to a desired cell distribution network output. The tunable receivers are divided into k=N/n groups $16_1 \ldots 16_k$. Each of the groups of tunable receivers comprises m tunable receivers which produce the groups of inputs to the output packet switch modules $12_1$ to $12_k$ of FIG. 1. For example, group $16_1$ of tunable receivers comprises m tunable receivers $16_{1,1}$ to $16_{1,m}$, which produce the m inputs for output packet switch module $12_1$.

The electronic control function associated with the star-coupler-based cell distribution network 10 is the assignment or scheduling of the input to which each output receiver must tune during each cell period. This assignment or scheduling function of the cell distribution network 10 can be accomplished by an external electronic controller performing its task at a much slower speed than the cell data rate. As described in detail below, there may be N/n pipeline controllers working independently in parallel, each one dedicated to one of the separate output groups $16_1$ to $16_N$. The pipelining operation of these pipeline controllers permits increased switch capacity and speed without a commensurate increase in electronic controller speed.

Figure 3:
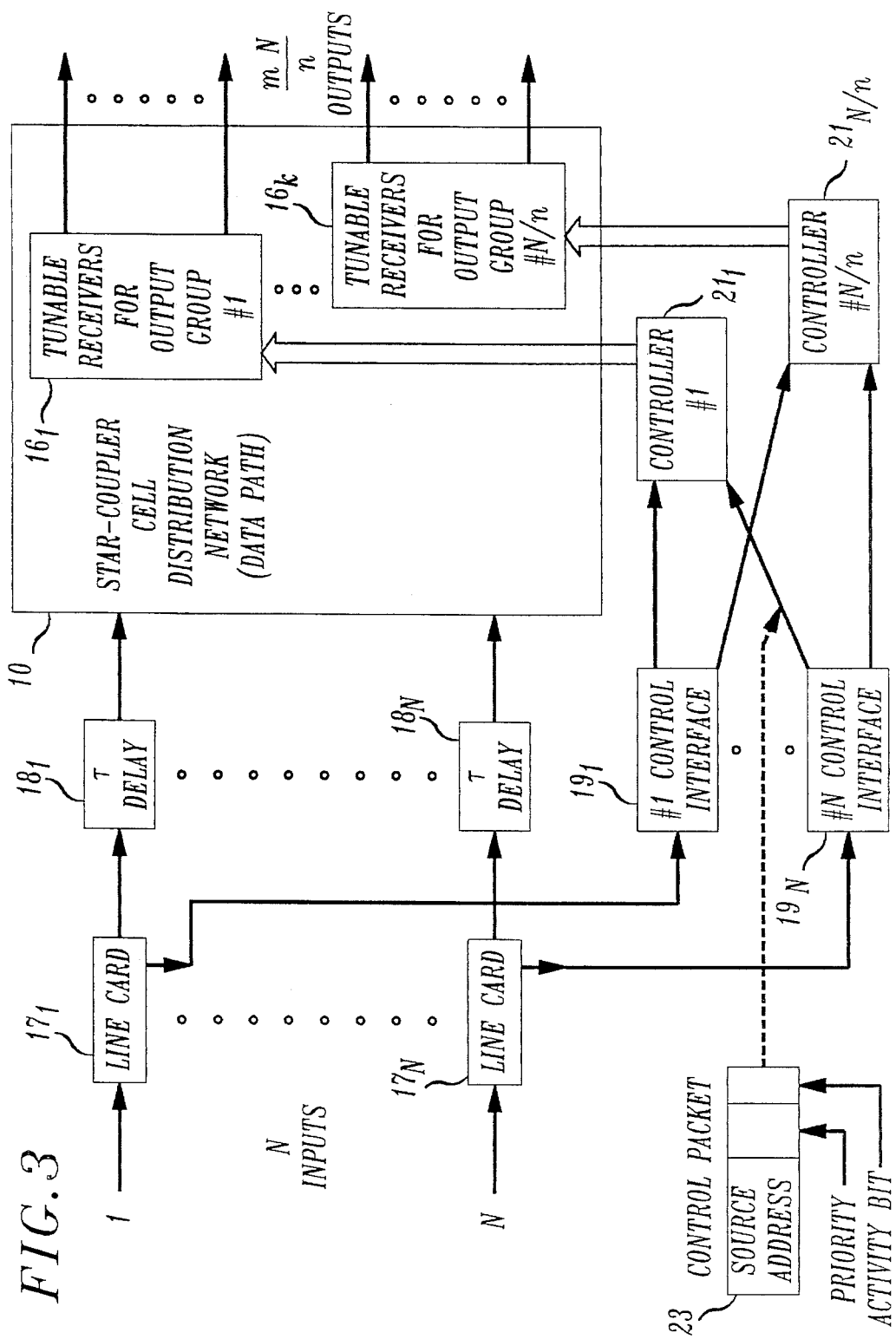
FIG. 3 shows a pipeline electronic controller for the optical cell distribution network shown in FIG. 2.

FIG. 3 shows the details of an electronic controller which is responsive to destination-identifying header information in the data packets for directing the receivers in the cell distribution network 10 to tune to appropriate carrier frequencies so that they may be responsive to an appropriate cell input. Once the receivers are tuned to appropriate carrier frequencies, they can accept appropriate data packets appearing on the cell inputs for output to the desired output packet switch modules $12_1$ to $12_k$. Each of the ATM cell inputs 1, 2, . . . N is connected to a respective one of line cards $17_1$ to $17_N$. Each of the line cards $17_1$ to $17_N$ makes available the header information in each of the data packets to a respective one of the control interfaces $19_1$ to $19_N$. Each of the control interfaces is responsive to the header information and creates a control packet 23 for each received ATM cell. The control packet comprises a source address which uniquely identifies the ATM cell input from which the interface received header information. The control packet also contains an activity bit which specifies whether or not a data packet appears at that input during that particular time slot. The control packet finally includes a priority bit consistent with the priority bit in the header information appended to the data packet. The priority bit specifies the priority level of this particular data packet. The priority level indicates how the data packet is to be treated in the event of conflicting requirements of sending multiple data packets to the same output during a given time slot.

The control packets produced by each of the control interfaces of FIG. 3 are directed to all of a series of pipeline controllers $21_1$ to $21_{N/n}$ where they are pipeline processed to produce frequency-tuning commands for the tunable receivers in the groups $16_1 \ldots 16_k$ shown in FIGS. 2 and 3.

The pipeline operation of the controllers $21_1$ to $21_N$ permits the electronic controller, which sets the frequencies to which the receivers are tuned, to operate at a rate which is significantly less than the data bit rate in the optical portion of the switching system. In the past, electronic controllers in electro-optic switching systems were constrained to complete one cycle of operation in a time period which was less than or equal to the duration of a time slot. Applicants have found, however, that it is possible to operate the electronic controller of ATM packet switching systems at speeds which result in cycle times which are longer than the time of each slot by using a pipeline circuit in the controllers which process the control packets in FIG. 3. This permits the controller to begin accepting a new control packet during the next time slot before the controller has fully processed a control packet from a prior time slot into frequency commands for the tunable receivers. The processing of multiple control packets by a single pipeline electronic controller thus may occur at least partially in parallel and simultaneous fashion because of the pipelining operation in that controller.

When such pipeline circuits are used as the controllers $21_1$ to $21_{N/n}$ of FIG. 3, it is necessary that the appearance of data packets on the input of the cell distribution network be delayed by a predetermined amount. In this regard, time delay elements $18_1$ to $18_N$ are provided between the line cards of FIG. 3 and the inputs of the cell distribution network 10. In the example of the invention shown in FIG. 3, the time delays provided by the elements $18_1$ to $18_N$ are equal and are such that the data packets are presented to the input of the cell distribution network at the same time that their corresponding control packets have been passed through the pipeline controllers of FIG. 3 and have been processed into frequency tuning commands for the receivers.

Figure 4:
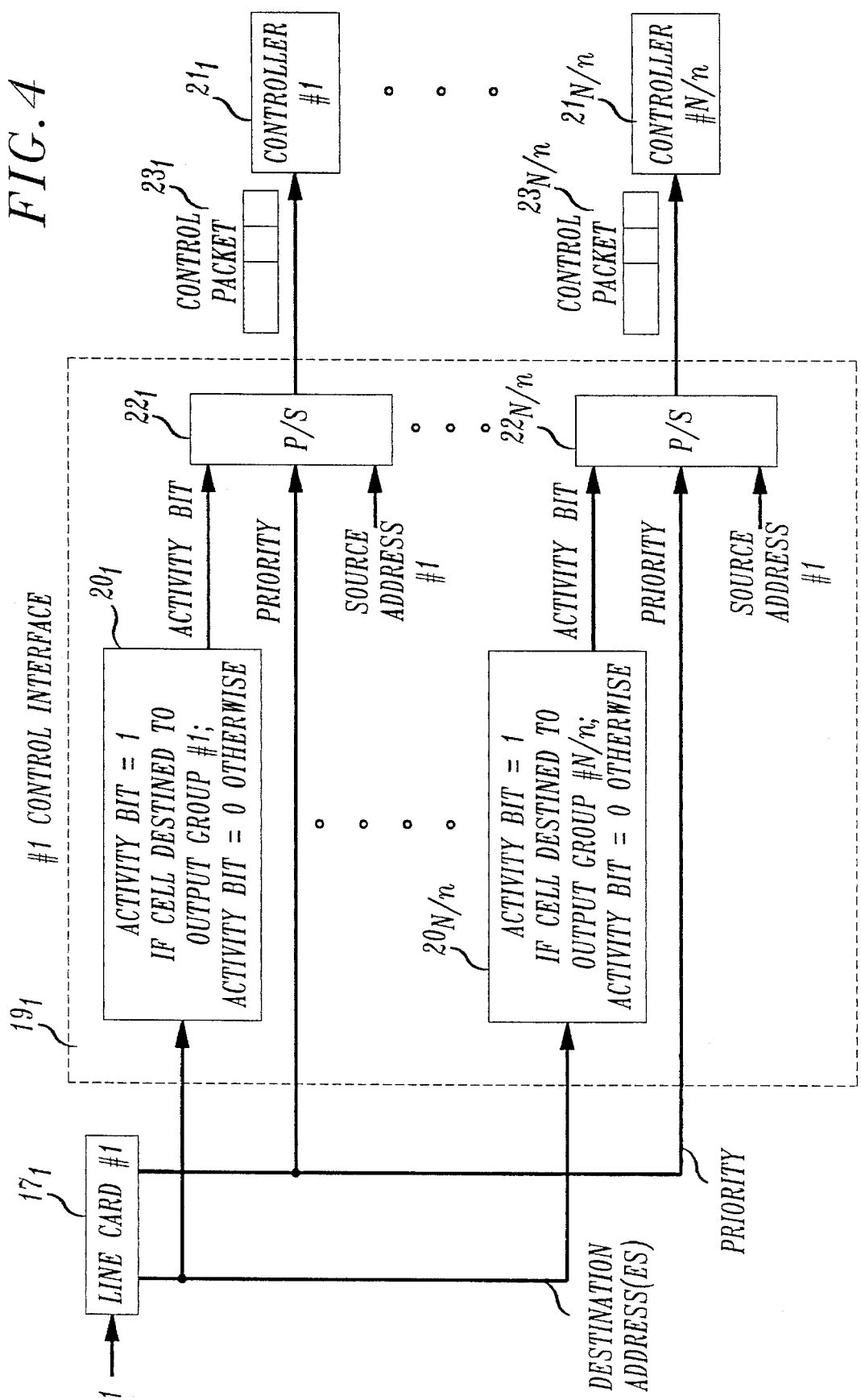
FIG. 4 is a more detailed diagram of one of the control interfaces in the electronic controller shown in FIG. 3.

FIG. 4 shows, in more detail, one of the control interfaces $19_1$ shown generally in FIG. 3. The details of the other control interfaces $19_2$ to $19_N$ are similar. FIG. 4 shows a line card $17_1$, which is responsive to data packets appearing on ATM cell input 1 of the packet switching system. The line card makes available destination addresses and priority information to the control interface $19_1$. The destination addresses, which indicate where the particular data packet now appearing on input 1 is to be directed, are made available to a series of activity bit blocks $20_1$ to $20_{N/n}$. In those blocks $20_1$ to $20_{N/n}$, a determination is made as to which output group the data packet is to be directed. In this example of the invention, the activity bit is set to 1 by the particular block or blocks $20_1$ to $20_{N/n}$ which correspond to the output group or groups to which the data packet is to be sent. All other blocks set their respective activity bits to zero. The activity bits from blocks $20_1$ to $20_{N/n}$ are each sent to respective parallel-to-serial converters $22_1$ to $22_{N/n}$. The priority bits from the line card $17_1$ are also directed to those parallel-to-serial converters. A source address, which uniquely identifies the fixed-frequency transmitter with which the control interface is associated, is also input to each of the parallel to serial converters $22_1$ to $22_{N/n}$, respectively. In the case of the control interface $19_1$ of FIG. 4, a source address for laser transmitter $13_1$ is input to each of the parallel-to-serial converters $22_1$ to $22_{N/n}$. The parallel-to-serial converters assemble the control packets $23_1$ to $23_{N/n}$ and send them serially to the pipeline controllers $21_1$ to $21_{N/n}$ in the electronic controller for the cell distribution network 10. Similarly, the control interfaces $19_2$ to $19_N$ are responsive to their respective ATM cell inputs 2, . . . N and line cards $17_2$ to $17_N$ to each produce a set of N/n control packets each containing activity bits, priority bits, and source addresses identifying the respective transmitters to which the control interfaces $19_2$ to $19_N$ are connected.

Figure 5:
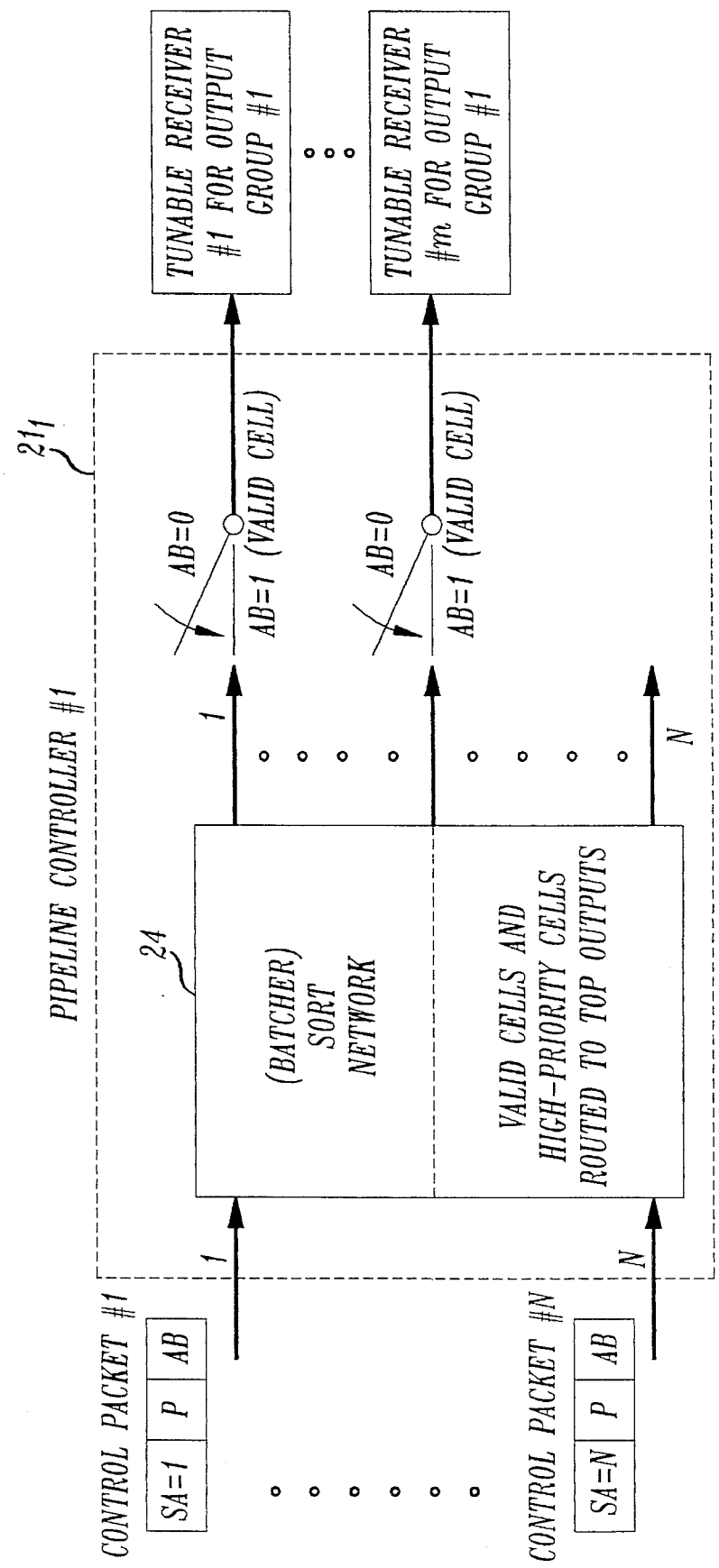
FIG. 5 is a more detailed diagram of one of the pipeline controllers in the electronic controller shown in FIG. 3.

The control packets $23_1$ to $23_{N/n}$ produced by the control interface $19_1$ are then sent to the inputs of the series of pipeline controllers $21_1$ to $21_{N/n}$ shown generally in FIGS. 3 and 4. One of the pipeline controllers $21_1$, with its associated control packet inputs, is shown in FIG. 5. The other pipeline controllers $21_2$ to $21_{N/n}$ are similar and each respond in similar fashion to the respective N/n control packets produced by each of the control interfaces $19_1$ to $19_N$. The pipeline controller $21_1$ comprises a pipelining circuit which passes the control packets to the tunable receivers as frequency-tuning commands in amounts of time which may exceed the duration of a time slot. In a preferred example of the invention shown in FIG. 5, the pipelining circuit comprises a sorting network, such as a Batcher sorting network 24, which causes valid cells, namely, control packets having activity bits equal to 1 to be routed to the top outputs of the sorting network. Cells having activity bits equal to 1 are sorted according to priority bit at the outputs of the sorting network, the higher the priority, the closer to the top output the corresponding control packet is directed. The top m outputs of the sorting network of FIG. 5 are digital words which are directed to the tunable receivers in output group 1 and are interpreted as frequency commands to which the receivers tune. The other pipeline controllers $21_2$ to $21_{N/n}$ similarly direct appropriate digital words to their respective groups of tunable receivers via the top m outputs of their sorting networks.

The switches shown in the output line of the sorting network 24 of FIG. 5 represent the action taken in response to the activity bits being 1 or 0, in this instance, 1 indicating the presence of a valid cell and 0 indicating the absence of a valid cell. When there is a valid cell on one of the m uppermost output lines of the sort network 24 (AB=1) that output line is connected to an associated tunable receiver for directing that receiver to tune to the frequency of the laser transmitter designated by the control packet on the output line from the sort network having AB=1. On the output lines from the sort network 24 indicating the absence of a valid cell (AB=0), no connection is made between that output line and an associated tunable receiver.

Figure 6:
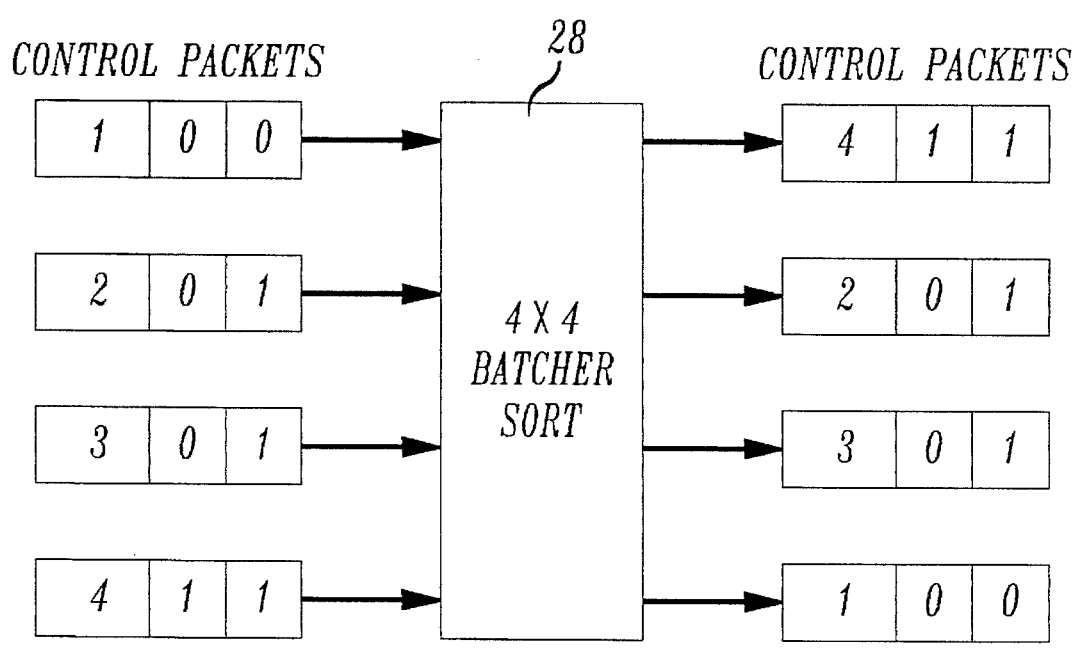
FIG. 6 shows a particular example of a sorting operation performed by the Batcher sort network like the one shown in FIG. 5.

FIG. 6 shows one simple example of how a 4×4 Batcher sorting network 28 may operate on the control packets 23 of this invention. Four control packets, one for each of four inputs 1 to 4 are presented at the input of the Batcher sorting network 28 of FIG. 6. The priority bits for the control packets associated with inputs 1 to 3 are 0 and the priority bit for the control packet associated with input 4 is 1. The activity bit for the control packet associated with input 1 is 0 and the activity bits for the control packets associated with inputs 2, 3, and 4 are 1. As shown in FIG. 6, the Batcher sorting network 28 orders the inputs such that the control packets having activity bits equal to 1 appear at the top outputs of the sorting network. Within that group of outputs corresponding to inputs having activity bits of 1, the sorting network orders the outputs in accordance with the priority bits so that the input control packet having the highest priority appears at the top output of the sorting network.

To summarize, header information in the incoming cells is read in line cards or line interfaces, and is passed as control information to pipeline controllers as control packets. A control packet may comprise an activity bit, which denotes whether a valid cell is destined to that particular output group, a priority field, and an input or source address. As header information is made available from the line card, a control interface generates the control packets and sends them to all the pipeline controllers. Consequently, in each pipeline controller, there are N received control packets per cell period.

The pipeline controller must select up to m (e.g., 32) input addresses for the m receivers in each group for reception. If the required processing time to do so is $\tau$, and if $\tau$ is less than a cell period or time slot period $T_c$, then a single cell delay must be inserted in the data path. It is very important to recognize that $\tau > T_c$ is also permissible as long as the following three conditions are satisfied: (i) A delay $\geq \tau$ is needed in the data path and is implementable; (ii) the controller can accept incoming control packets on a "pipelined" basis (i.e., successive control packets can enter the controller for processing without waiting for the previous assignment to be done); and (iii) the controller speed must be adequate to accept successive control packets at the rate of one control packet per cell period or time slot.

Condition (iii) above dictates the required controller speed. For a p-bit priority field, the total number of bits in a control packet is simply $C = \log_2 N + p + 1$, where $\log_2 N$ bits represent the source address, and the 1 accounts for the activity bit. Therefore, the minimum bit period for the controller is $T_c/C$.

Condition (ii) requires pipelined operation. A Batcher sorting network 24 may be used to satisfy this requirement. VLSI technology may be used to implement this.

Condition (i) on the data delay can be satisfied, for example, if a Batcher sorting algorithm is used for control. A Batcher sort incurs only (½)(b)(b+1) bits of delay, where b=$\log_2 N$. Table I tabulates examples of equivalent ATM cell delays for different cases of interest, which are all acceptably small (two or three cells).

TABLE I

Delay Needed In The Data Path To Account For the Controller Processing

| Switch Size, N | 64 | 128 | 256 | 512 | 1024 |
| --- | --- | --- | --- | --- | --- |
| Batcher SORT Delay (bits) | 21 | 28 | 36 | 45 | 55 |
| Controller Processing Time (nsec) | 296 | 339 | 382 | 424 | 466 |
| Equivalent Number Of Cells Delayed | 2 | 2 | 3 | 3 | 3 |

The invention of this application permits the construction of an optoelectronic packet switching system having a high capacity, a high data bit rate, and a relatively low electronic controller speed. In specific terms, the electronic controller may perform its function at a much slower speed than the cell data rate.

Figure 7:
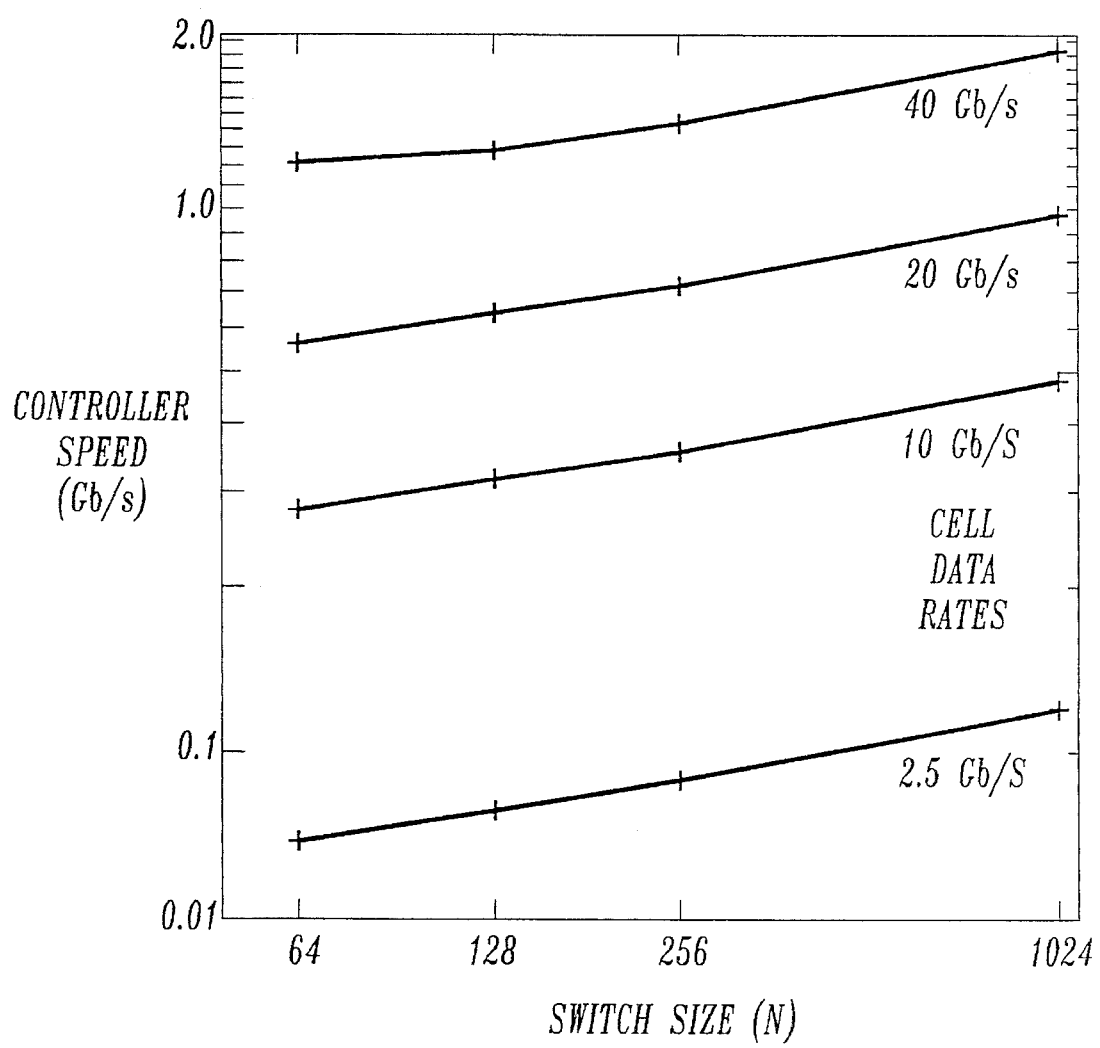
FIG. 7 is a graph which illustrates the electronic controller speed required as a function of switch size at four cell data rates from 2.5 Gb per sec. to 40 Gb per sec.

As described above, a pipelining circuit may be used so that the cycle time of the electronic controller may be longer than the time slot duration. FIG. 7 is a graph which illustrates the controller speed required for a given switch size N at four ATM cell data rates from 2.5 Gb per sec. to 40 Gb per sec., assuming a three bit priority field p. It is apparent from FIG. 7 that use of the invention of this application will result in lower electronic controller speeds than were thought possible for a given switch size and data rate. Specifically, packet switches having up to more than 1000 lines and having cell data rates on the order of multiple tens of Gbit/sec. may be controlled electronically by circuitry operating at only hundreds of Mbit/sec. to low Gbit/sec. rates.

We claim:

1. A packet switching apparatus, comprising:

a plurality of inputs each for receiving a succession of data packets each appearing in successive time slots of predetermined duration;

an optical cell distribution network for distributing the data packets received at the inputs to selected ones of a plurality of desired outputs;

the cell distribution network comprising a plurality of optical transmitters, each responsive to one of the plurality of inputs, an optical star coupler for receiving outputs of the plurality of optical transmitters and producing outputs corresponding to the sum of the outputs of the optical transmitters, and a plurality of optical receivers, each responsive to an output of the Optical star coupler and a respective pipeline controller; and an electronic pipeline controller, connected to at least one of the plurality of inputs and responsive to destination identifying header information in a succession of data packets received on an input to which the pipeline controller is connected, for producing an output directing the cell distribution network to distribute the data packets to the plurality of outputs in accordance with the header information;

the electronic pipeline controller being adapted to receive a succession of headers each related to a respective data packet received on the input to which the pipeline controller is connected, the electronic pipeline controller being adapted to process information in each header into a pipeline controller output, the pipeline controller being adapted to begin processing information in a header into a pipeline controller output prior to completely processing information in a prior header in the succession of headers into a pipeline controller output.

2. The packet switching apparatus of claim 1, in which the cell distribution network comprises:

a plurality of fixed-frequency laser transmitters, each responsive to one of the plurality of inputs;

an optical star coupler for receiving the outputs of the plurality of fixed° frequency laser transmitters and producing outputs corresponding to the sum of the outputs of the fixed-frequency laser transmitters; and a plurality of tunable receivers, each responsive to the output of the optical star coupler and the pipeline controller.

3. The packet switching apparatus of claim 1, in which the electronic pipeline controller comprises:

a sorting network responsive to signals related to header information in the data packets for placing, in predetermined order, signals to be sent to the cell distribution network which cause distribution of the data packets in accordance with the header information.

4. The packet switching apparatus of claim 1, further comprising:

a means for delaying the arrival of data packets at the cell distribution network by an amount corresponding to the time between the arrival of header information at the input of the electronic pipeline controller and the production of the output of the electronic pipeline controller directing the cell distribution network to distribute data packets to the plurality of outputs of the cell distribution network.

5. The packet switching apparatus of claim 1, in which the electronic pipeline controller operates at a speed such that the time for it to produce an output in response to an input of destination identifying header information is greater than the time slot duration.

6. A packet switching apparatus, comprising:

a plurality of inputs each for receiving a succession of data packets each appearing in successive time slots of predetermined duration;

an optical cell distribution network for distributing the data packets received at the inputs to selected ones of a plurality of desired outputs; and an electronic pipeline controller, connected to at least one of the plurality of inputs and responsive to destination identifying header information in a succession of data packets received on an input to which the pipeline controller is connected., for producing an output directing the cell distribution network to distribute the data packets to the plurality of outputs in accordance with the header information;

the electronic pipeline controller being adapted to receive a succession of headers each related to a respective data packet received on the input to which the pipeline controller is connected, the electronic pipeline controller being adapted to process information in each header into a pipeline controller output, the pipeline controller being adapted to begin processing information in a header into a pipeline controller output prior to completely processing information in a prior header in the succession of headers into a pipeline controller output;

the pipeline controller comprising:

a control interface responsive to header information in the data packets appearing on one of the plurality of inputs for producing a control packet containing a source address, at least one priority bit, and at least one activity bit; and a pipeline circuit responsive to the control packets from the control interface for producing distribution commands for the cell distribution network.

7. The packet switching apparatus of claim 6, in which the pipeline controller comprises a sorting network.

8. The packet switching apparatus of claim 7, in which the sorting network is a Batcher sorting network.

* * * * *